(12) United States Patent
Wong et al.

(10) Patent No.: US 9,342,913 B2
(45) Date of Patent: May 17, 2016

(54) METHOD AND SYSTEM FOR EMULATING INVERSE KINEMATICS

(71) Applicant: NGRAIN (Canada) Corporation, Vancouver (CA)

(72) Inventors: Chun Yue Gordon Wong, Coquitlam (CA); Graham Thurstan Smith, Saskatoon (CA); Keith William Reid, Richmond (CA)

(73) Assignee: NGRAIN (CANADA) CORPORATION, Vancouver (CA)

(*) Notice: Subject to any disclaimer, the term of this patent is extended or adjusted under 35 U.S.C. 154(b) by 298 days.

(21) Appl. No.: 13/770,900

(22) Filed: Feb. 19, 2013

(65) Prior Publication Data

US 2014/0232716 A1   Aug. 21, 2014

(51) Int. Cl.
*G06T 13/20* (2011.01)

(52) U.S. Cl.
CPC .............. *G06T 13/20* (2013.01); *G06T 2200/24* (2013.01)

(58) Field of Classification Search
CPC ...... G06T 13/40; G06T 13/00; A63F 2300/66
See application file for complete search history.

(56) References Cited

U.S. PATENT DOCUMENTS

| | | | |
|---|---|---|---|
| 6,144,385 A * | 11/2000 | Girard | 345/424 |
| 6,559,860 B1 * | 5/2003 | Hamilton et al. | 715/700 |
| 6,867,774 B1 | 3/2005 | Halmshaw et al. | |
| 7,050,054 B2 | 5/2006 | Halmshaw | |
| 7,218,323 B1 | 5/2007 | Halmshaw et al. | |
| 7,317,456 B1 | 1/2008 | Lee | |
| 7,420,555 B1 | 9/2008 | Lee | |
| 7,804,503 B2 * | 9/2010 | Fernandez et al. | 345/475 |
| 7,965,290 B1 | 6/2011 | Kouznetsov et al. | |
| 8,217,939 B1 | 7/2012 | Bonciu et al. | |
| 8,237,719 B1 * | 8/2012 | Trezevant et al. | 345/473 |
| 8,913,065 B2 * | 12/2014 | McCartney et al. | 345/473 |
| 2010/0214313 A1 * | 8/2010 | Herman et al. | 345/593 |

FOREIGN PATENT DOCUMENTS

| | | |
|---|---|---|
| WO | 0207088 A2 | 1/2002 |
| WO | 0207089 A2 | 1/2002 |

OTHER PUBLICATIONS

Autodesk Maya, 2010 User manual ("Maya"), http://download.autodesk.com/us/maya/2010help/index.html?url=Inverse_kinematics_Limiting_the_range_of_motion_of_an_IK_system.htm,topicNumber=d0e18963.*

Woo et al., "Myths and truths of Interactive Volume Graphics," Interservice/Industry Training, Simulation, and Education Conference (I/ITSEC) Paper No. 1755, 2004, pp. 1-10.

* cited by examiner

*Primary Examiner* — Maurice L McDowell, Jr.
*Assistant Examiner* — Raffi Isanians
(74) *Attorney, Agent, or Firm* — Seed IP Law Group PLLC (57) ABSTRACT

System and method are provided for achieving "inverse kinematics" of 3D graphics depicting an object that consists of multiple parts. The system displays an animation of a 3D graphics object that consists of multiple moving parts. The animation is associated with an animation timeline defined by two end points—a starting time point and an ending time point. The user can manipulate the object back and forth along the animation timeline, between the two end points, by selecting (e.g., clicking on) and moving (dragging) any of the movable parts of the object on a display screen. In short, the user can use any of the movable parts as a scroll/slide button to move the animation forward and backward along the animation timeline, to achieve real-time inverse kinematics movement.

19 Claims, 5 Drawing Sheets

METHOD AND SYSTEM FOR EMULATING INVERSE KINEMATICS

BACKGROUND

1. Technical Field

The present invention relates generally to interactive computer graphics, and more specifically to achieving inverse kinematics of 3D graphics depicting how multiple parts of an object interact with each other, by using an animation of the object to build a constraint on the parts movement.

2. Description of the Related Art

Three-dimensional ("3D") digital data may be produced by a variety of devices that involve three-dimensional scanning, sampling and/or numerical modeling. For example, computed tomography (CT) and magnetic resonance imaging (MRI) devices scan portions of a human body and generate image slices of the body, which when combined or stacked, generate a 3D representation of the body including its surface and internal volume.

Volume graphics represent a promising way to achieve the degree of realism required for high quality 3D simulations and visualization applications because volume models can contain all the surface and internal characteristics of a real object. This is in contrast to, for example, polygon-based graphics, which contain only the information about the surfaces of a 3D object. In the case of volume graphics, volume elements (i.e., "voxels") are the base data used to represent 3D objects. Typically, voxels are simply pixels that have a third coordinate z in addition to x and y coordinates in a Cartesian coordinate system (though voxels may take various other forms, also). In other words, voxels are equally sized cubes that form a discretely defined 3D space. A typical voxel-based 3D scene can consist of one or more "voxel sets," each of which in turn consists of one or more voxels. For example, the 3D scene may include one or more sets of MRI slices, each forming a voxel set, which in turn includes a plurality of voxels within each voxel set.

3D voxel data are rendered to produce a 2D image on a suitable output device, such as a video display or a printer. As used herein, the term "render" means to produce a 2D graphics image on an output device (e.g., a display screen) from a 3D graphics data file, and typically involves creating an image using color, texture, etc., to give the image a realistic look. In typical applications of voxel-based technologies, only one voxel set is rendered. For example, in medical MRI applications, a single voxel set representing a single MRI slice may be rendered at a time.

In other applications, such as in rendering voxel data produced using software available from NGRAIN (Canada) Corp. of Vancouver B.C., Canada, it is often necessary to render (sometimes a large number of) multiple voxel sets at a time. Briefly, NGRAIN® technology permits 3D modeling of an object, wherein each of multiple parts or layers forming the object is represented as a voxel set each consisting of one or more voxels. According to NGRAIN® technology, it is possible to render a large number of voxel sets representing multiple parts or layers together, while allowing a user to manipulate each part or layer separately in 3D space. For example, the user may break up the parts or layers to display an exploded view of an object, or to peel off an outer layer of the object to reveal its inner layer. NGRAIN® technology volume graphics are particularly suited for an interactive application to allow a user to manipulate a 3D object, for example, by rotating, resizing, or otherwise manipulating each individual part or layer of the object. Various details of NGRAIN® technology are described in commonly owned Patent Cooperation Treaty Publication No. WO 02/07088 A2 entitled "LIGHTING ADJUSTMENT METHODS AND APPARATUS FOR VOXEL DATA," commonly owned Patent Cooperation Treaty Publication No. WO 02/07089 A2 entitled "APPARATUS AND METHOD FOR ASSOCIATING VOXEL INFORMATION WITH DISPLAY POSITIONS," commonly owned U.S. Pat. No. 6,867,774 B1 entitled "METHOD AND APPARATUS FOR TRANSFORMING POLYGON DATA TO VOXEL DATA FOR GENERAL PURPOSE APPLICATIONS," commonly owned U.S. Pat. No. 7,050,054 B2 entitled "METHOD, APPARATUS, SIGNALS AND CODES FOR ESTABLISHING AND USING A DATA STRUCTURE FOR STORING VOXEL INFORMATION," commonly owned U.S. Pat. No. 7,218,323 B1 entitled "METHOD AND SYSTEM FOR RENDERING VOXEL DATA WHILE ADDRESSING MULTIPLE VOXEL SET INTERPENETRATION," commonly owned U.S. Pat. No. 7,317,456 B1 entitled "METHOD AND APPARATUS FOR TRANSFORMING POINT CLOUD DATA TO VOLUMETRIC DATA," commonly owned U.S. Pat. No. 7,420,555 B1 entitled "METHOD AND APPARATUS FOR TRANSFORMING POINT CLOUD DATA TO VOLUMETRIC DATA," commonly owned U.S. Pat. No. 7,965,290 B1 entitled "METHOD, SYSTEM, AND DATA STRUCTURE FOR PROGRESSIVE LOADING AND PROCESSING OF A 3D DATASET," and commonly owned U.S. Pat. No. 8,217,939 B1 entitled "METHOD AND SYSTEM FOR CALCULATING VISUALLY IMPROVED EDGE VOXEL NORMALS WHEN CONVERTING POLYGON DATA TO VOXEL DATA," which are all specifically incorporated herein by reference. Additional details of NGRAIN® technology can also be found in an article entitled "Myths and Truths of Interactive Volume Graphics" published in I/ITSEC 2004 Conference.

BRIEF SUMMARY

One area in which interactive 3D graphics may be useful, regardless of whether 3D graphics are voxel-based, polygon-based, or based on any other 3D graphics technique, is inverse kinematics. Briefly, movement of an articulated object, such as a human body, is typically expressed in terms of kinematic equations. Kinematic equations define movement of various parts of an articulated object in terms of joint parameters. Forward kinematics use joint parameters to compute the shape of a resulting configuration of an object. For example, forward kinematics use the joint parameters of an elbow to compute the resulting shape of an arm. Inverse kinematics, in reverse, use a resulting or desired shape of an object to compute joint parameters. For example, inverse kinematics use the desired position of a hand to compute the joint parameters of an elbow that would provide that desired hand position. One drawback of typical inverse kinematics is that processing kinematic equations to determine joint parameters is computationally intensive and time-consuming, which makes the inverse kinematics unsuited for a real-time interactive application. Another drawback is that defining kinematic equations to express movement of an articulated object is no easy task, especially when the object has an intricate structure including numerous parts that interact with each other in complex relationships.

According to various embodiments of the present invention, a system and a method are provided for achieving inverse kinematics of 3D graphics depicting an object that consists of multiple moving parts. The system displays an animation of a 3D graphics object that consists of multiple moving parts. The animation may be based on a plurality of key frames depicting the 3D graphics object (e.g., a voxel-based object and a polygon-based object), or may be other types of 3D animation not based on key frames, such as a parametric animation and a spline-based animation. In all cases, the animation is associated with an animation timeline defined by two end points—a starting time point and an ending time point. The user can then manipulate the object forward and backward along the animation timeline, between the two end points, by selecting (e.g., clicking on) and moving (dragging) any of the movable parts of the object as shown on a display screen. In short, the user can use any of the movable parts as a scroll/slide button to move the animation forward and backward along the animation timeline, to achieve real-time inverse kinematics. For example, the user can interactively view how the pistons in an engine move relative to each other, or how the flight controls in a helicopter operate the rotor head. According to various embodiments of the present invention, an animation itself is used to define a constraint on how multiple parts of an object depicted in the animation move relative to each other. The system and method need not rely on formulating and computing complex kinematic equations to achieve inverse kinematics, and thus allows a user to quickly build an inverse kinematics 3D graphics animation as well as to interact with the animation in real time.

DETAILED DESCRIPTION

Figure 1A:
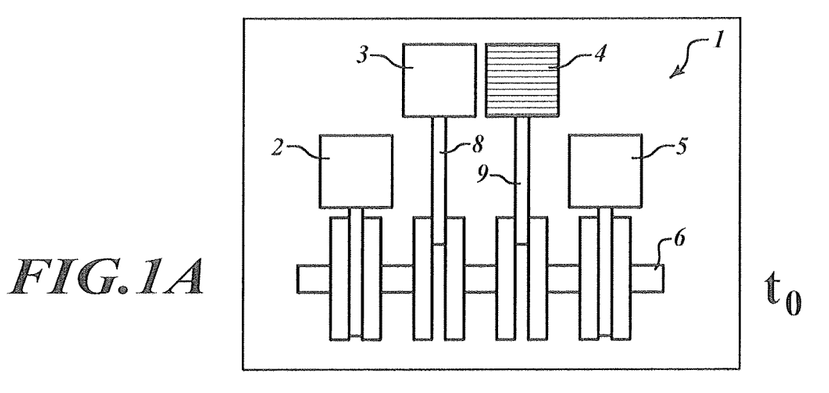
FIGS. 1A-1C illustrate three key frames of an animation depicting how various parts of an engine interact with each other, which may be used for implementing inverse kinematics according to an embodiment of the present invention.
Figure 1B:
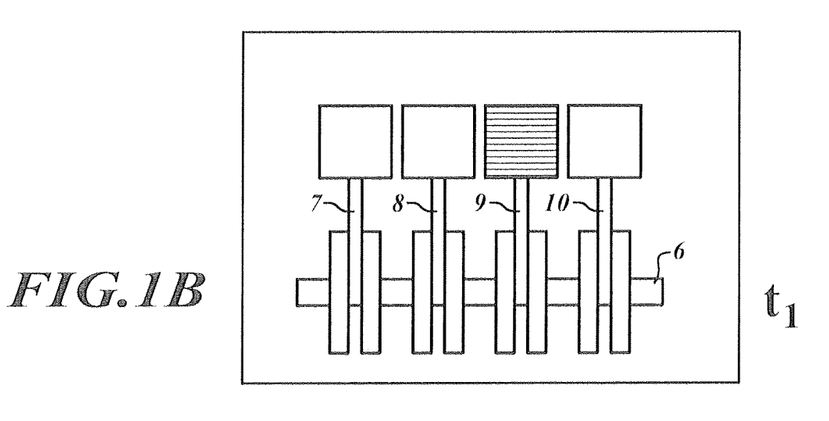
Figure 1C:
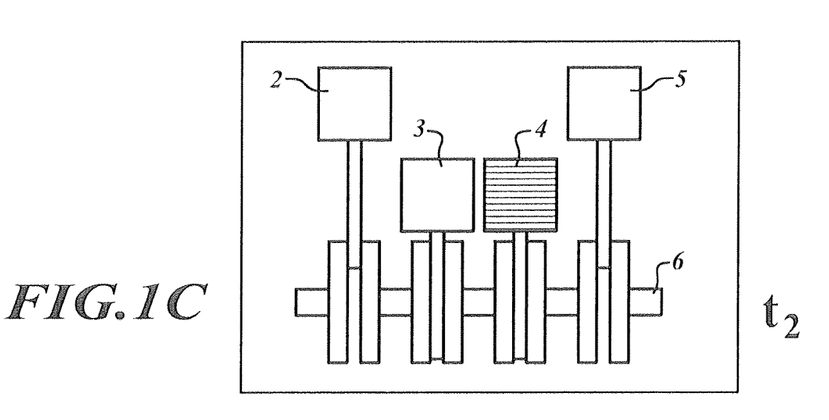

FIGS. 1A-1C are three key frames of a sample animation illustrating movement of an object 1 in the form of a 4-cylinder inline engine. For ease of illustration, the engine in the illustrated example consists of only nine parts—four pistons (2~5), one crankshaft (6), and four connecting rods (7~10) that respectively connect the pistons to the crankshaft. In 3D volume graphics, each of these parts is represented as a voxel set, which together form the object 1. The animation consists of a first key frame of FIG. 1A at t0 where the pistons 3 and 4 are positioned higher than the pistons 2 and 5, a second key frame of FIG. 1B at t1 where the pistons 3 and 4 are lowered while the pistons 2 and 5 are raised so that all four pistons 2~5 are lined up, and a third key frame of FIG. 1C at t2 where this time the pistons 2 and 5 are positioned higher than the pistons 3 and 4. Thus, the animation based on the key frames of FIGS. 1A-1C illustrates a half cycle of the engine movement. An animation illustrating a full cycle of the engine movement may be formed by the key frames of FIGS. 1A-1C at t0, t1, t2, followed by another key frame that is the same as the key frame of FIG. 1B at t3 and yet another key frame that is the same as the key frame of FIG. 1A at t4.

Figure 2:
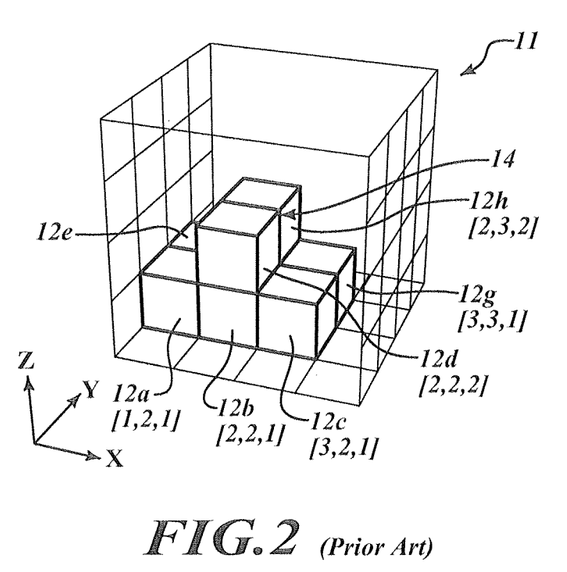
FIG. 2 is a schematic representation of 3D volume graphics data, which is one example of 3D graphics data suitable for representing various parts of an object, whose movement can be shown in an animation of the object.

FIG. 2 shows an example of a 4×4×4 voxel set 11 containing 64 possible geometric locations. Eight of these locations include occupied voxels 12a-12h, at [1,2,1], [2,2,1], [3,2,1], [2,2,2], [1,3,1], [2,3,1], [3,3,1], and [2,3,2], respectively, in a Cartesian coordinate system, which collectively form a 3D object 14. The rest of the locations within the voxel set 11 are empty. Typically each voxel set is a mixture of occupied voxels and empty voxels. Each voxel within the voxel set 10 is defined by its geometric location [x, y, z] and is associated with a set of attributes, such as its shade information including color and alpha values, normal (vector), texture, part/layer number (i.e., to which voxel set it belongs), etc.

Referring back to FIGS. 1A-1C, according to one embodiment, each of the parts (2~10) of the engine 1 may be represented as a voxel set in 3D volume graphics as schematically shown in FIG. 2. In other embodiments, each of the parts (2~10) may be represented based on polygon-based or any other 3D graphics techniques. That is, FIGS. 1A-1C are the key frames of an animation illustrating movement of the engine 1 as represented in any type of 3D graphics data format.

In the illustrated embodiment, an animation is based on a 3D volume graphics object, for example, and consists of multiple key frames, each depicting the object at a certain point along an animation timeline. The object or, more specifically, at least some of the parts forming the object are movable along the animation timeline. In the illustrated example, FIGS. 1A-1C respectively illustrates a state of the engine 1 at time t0, t1 and t2 along the animation timeline. Note that FIGS. 1A-1C in this example are rendering results of 3D volume graphics in which the object 1 is formed as a collection of nine voxel sets each representing the nine engine parts 2~10.

According to various embodiments of the present invention, inverse kinematics of a 3D graphics object consisting of multiple parts are implemented based on multiple key frames of an animation. In other various embodiments, inverse kinematics of a 3D graphics object are implemented based on an animation that is not based on key frames, such as a parametric animation and a spline-based animation. Regardless of what type of animation is used, in some embodiments, a user may specify an entire animation to be used for implementing inverse kinematics, while in other embodiments the user may specify a portion of the entire animation, such as a portion corresponding to time t0-t2 of an animation having a total length of time t0-t5, to implement inverse kinematics. Typically, the user may select a portion of the animation that shows how mechanical parts of interest interact with each other in complex parts relationships. As used herein, the animation timeline means a finite timeline of the animation (or a portion thereof) that has been selected for use in implementing inverse kinematics. The animation timeline starts at the start time $t_{start}$ and ends at the end time $t_{end}$.

In the following description, a 3D volume graphics object is used as one example of a 3D object suitable for forming an animation, on which inverse kinematics may be implemented. However, the inverse kinematics algorithm according to various embodiments of the present invention may be equally applicable to other types of 3D graphics objects such as a polygon-based 3D object. Thus, the present invention is by no means limited to application to a 3D volume graphics object.

Figure 3:
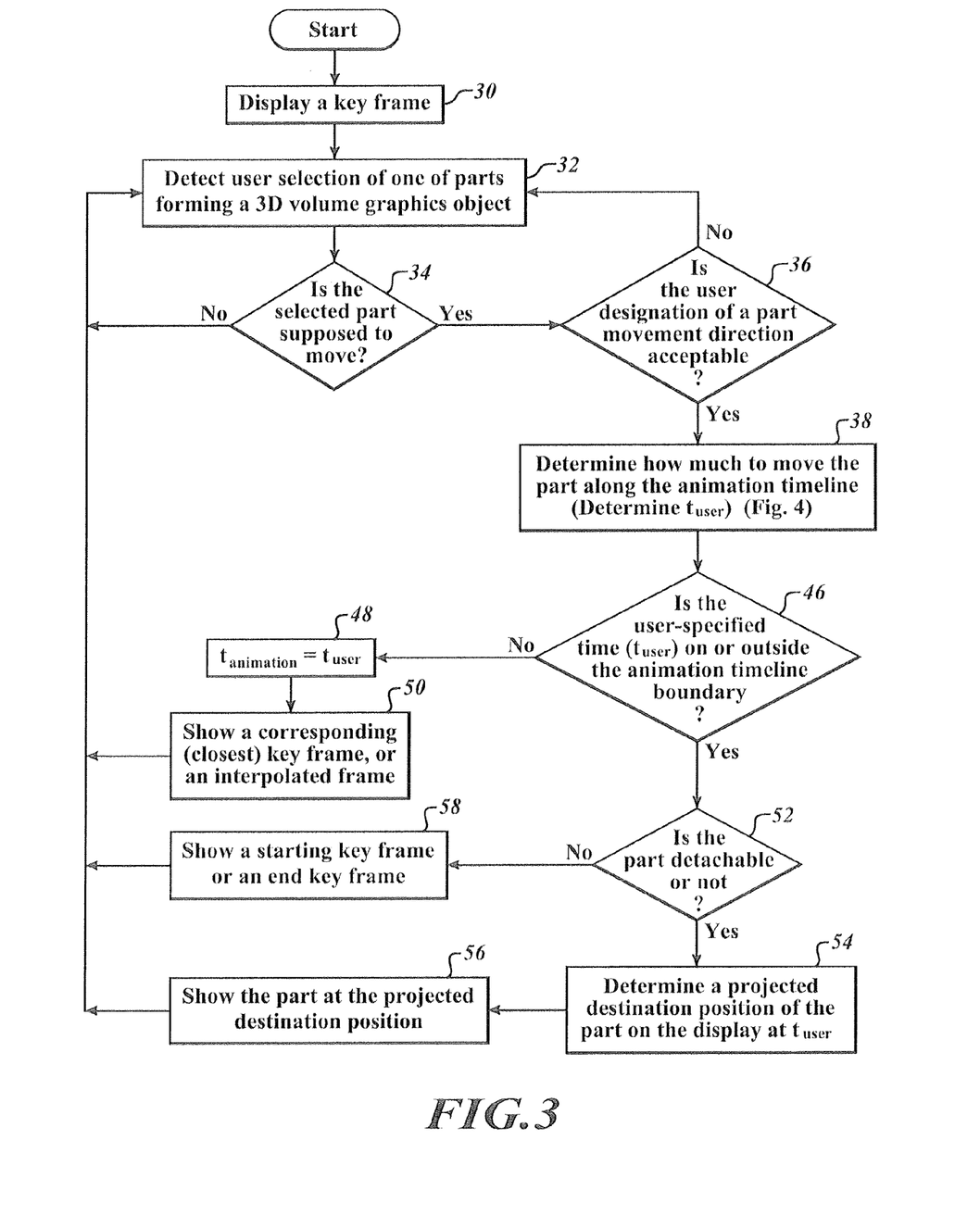
FIG. 3 is a flow chart illustrating an inverse kinematics algorithm executed by a processor capable of 3D volume graphics rendering, according to one embodiment of the present invention.

FIG. 3 is a flow chart illustrating an inverse kinematics algorithm executed by a processor capable of 3D volume graphics rendering, according to one embodiment of the present invention. Before the algorithm is executed, it is assumed that a set of key frames of an animation, which show interactive movement of at least some of the parts forming an object, have been selected by the user and loaded to the processor's memory. The key frames show a 3D volume graphics object and, therefore, each key frame is associated with a list of parts that form the object and voxel sets (see FIG. 2) that respectively represent those parts, wherein each voxel within each of the voxel sets is defined by its geometric location [x, y, z] and is associated with a set of attributes.

In block 30, the algorithm displays one key frame out of the set of key frames on a display screen for the user. In this example, the key frame of time $t0=t_{start}$ shown in FIG. 1A is displayed.

In block 32, user selection of one of the parts that form the object is detected, for example by detecting user selection of a pixel on the display corresponding to the part when the user clicks on, or places a cursor over, the selected part on the display. In case the display is a touch sensitive display, the user may select a part by touching it with his/her finger or with a stylus pen. In the example illustrated in FIG. 1A, user selection of the piston 4 is detected, as shown by hatching applied to the piston 4.

In block 34, it is determined whether the selected part is a movable part. While in the illustrated embodiment, the object (engine) 1 includes only movable parts, in a typical application, the object includes various other parts that do not move amongst the set of key frames during the animation timeline, such as a housing for the engine (not shown). Also, some of the parts may be movable only during a certain time portion along the animation timeline (e.g., between time t1-t2) and do not move during the rest of the animation timeline (e.g., between time t0-t1). Thus, in block 34, whether a selected part is supposed to move is determined based on comparison between the positional information of the selected part in the current key frame (of time t0 in the present example) and the positional information of the same part in an adjacent key frame (of time t1 in the present example). If the positional information is the same, the selected part is determined to be not movable and the algorithm returns to block 32 and waits for another user selection of one of the parts on the display. In one embodiment, once a part is determined to be non-movable, the part is saved as a non-movable part such that it becomes unnecessary thereafter to calculate whether the part is movable or not in real time. In one embodiment, to indicate to the user that the selected part is not movable and thus to prompt the user to select another (movable) part, a visual appearance of a non-movable part does not change when selected. On the other hand, when a movable part is selected, its visual appearance may change to be shown in highlight or in a different color, for example, to confirm to the user that a movable part is selected.

If the selected part is determined to be movable, in block 36, it is determined whether user designation of a movement direction is generally aligned with the direction along which the selected part is supposed to move. User designation of a movement direction is indicated, for example, by the user moving (dragging) a cursor (or a finger, a stylus pen, etc.) from a point to another point on the display. When the user designation of a movement direction is detected, the user-designated movement direction is compared to a defined direction along which the selected part is supposed to move. The defined direction may be calculated based on the positional information of the selected part in the current key frame (of time t0 in the present example) and the positional information of the same part in an adjacent key frame (of time t1 in the present example). Also, the positional information of additional key frame(s) (of time t2 in the present example) may be used to generalize (or average out) the defined direction applicable for a longer duration of time along the animation timeline. As before, in one embodiment, when a defined movement direction is determined for a movable part, the part is saved with the defined direction information such that it becomes unnecessary thereafter to recalculate the defined direction in real time.

In the illustrated embodiment, the selected piston 4 is supposed to move generally downwardly from time t0 to t1, and thus the defined direction is generally downward in this case. In some embodiments, the defined direction is given as a range to accommodate a range of user-designated movement direction, i.e., to provide some tolerance for the user-designated movement direction. This may be desirable because user designation of a movement direction is expected to not precisely align with the defined direction of a selected part.

If it is determined that the user-designated movement direction does not correspond to the defined direction (which may include some tolerance, as described above), the algorithm returns to block 32 and repeats blocks 32-36 until it receives a user-designated movement direction for a movable part that corresponds to the defined direction.

In the present example, in which the current key frame is the initial key frame of time t0 ($=t_{start}$) as shown in FIG. 1A, the selected piston 4 may move only in one defined direction (generally downward) toward its position in the adjacent key frame of time t1. On the other hand, if the current key frame as displayed is neither an initial key frame at $t_{start}$ or a terminal key frame at $t_{end}$, the selected part may move in two defined directions. For example, referring to the key frame of time t1 as shown in FIG. 1B, from this key frame, the selected piston 4 may move generally upwardly from time t1 to t0 (backward), or may move generally downwardly from time t1 to t2 (forward). Thus, when the current key frame has two adjacent key frames on both sides along the animation timeline, the determination in block 36 is made with respect to each of two possible defined directions along which the selected part may move.

When block 36 detects user designation of a movement direction that corresponds to the defined direction, in block 38, it is determined how much to move the selected part in the defined direction on the display along the animation timeline, time-wise. In other words, a point on the animation timeline at which a frame of the animation would show the selected part in its user-specified destination position is determined. One example of an algorithm to effect block 38 is shown in a flow chart of FIG. 4.

Figure 4:
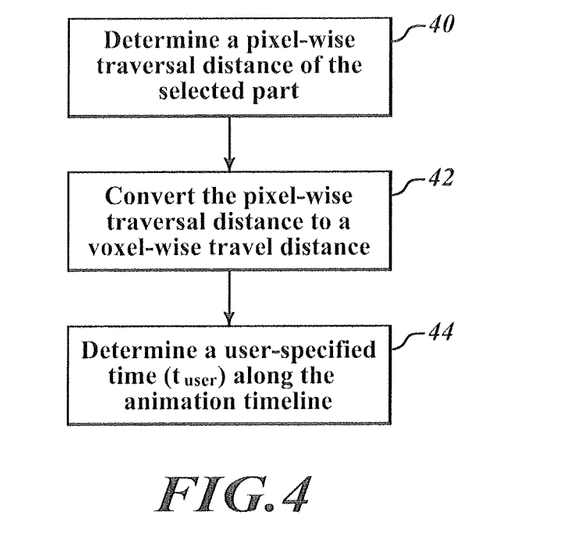
FIG. 4 is a flow chart illustrating a sample sub-algorithm for determining how much to move a part along an animation timeline, which may be used as part of the inverse kinematics algorithm of FIG. 3

In block 40, a pixel-wise traversal distance of the selected part as indicated by the user is determined. For example, it is determined how many pixels the user has traversed in what direction while dragging a cursor (or a finger, a stylus pen, etc.) on the display. The pixel-wise traversal distance is a distance by which the user wishes to move the selected part. For example, if the user has traversed 10 pixels along the Y axis of the display, the pixel-wise traversal distance is 10 pixels. As another example, if the user has traversed pixels in a diagonal direction at a 45-degree angle relative to 10 pixels along the X axis and 10 pixels along the Y axes, the pixel-wise traversal distance is $10\sqrt{2}$ pixels.

In block 42, the determined pixel-wise traversal distance is converted to a voxel-wise travel distance in the key frame, which is rendered based on 3D volume graphics. More generally, the determined pixel-wise traversal distance is converted to a 3D-space travel distance, i.e., the travel distance in the 3D graphics space whether it is voxel-based, polygon-based, etc. The conversion can be made based on mapping of the display dimensions to the key frame dimensions in 3D space, both of which are known. For example, if the display dimensions are 1024×768 while the key frame has the dimensions of 612 voxels along the X axis and 384 voxels along the Y axis (and a certain number of voxels along the Z axis), the voxel-wise travel distance corresponding to the pixel-wise traversal distance can be calculated by simply dividing the pixel-wise traversal distance by two. As a further example, if the 3D graphics object in the key frame is rendered on the display at an angle relative to a viewport of the display, for example when the object appears rotated (or tilted) on the display, the conversion should take into account the relative angle or the rotation angle. For example, if a pixel-wise traversal distance is indicated along a surface of the 3D graphics object that is at a 45-degree angle relative to the viewport and the user has traversed 3 pixels over that oblique surface on the display, the pixel-wise traversal distance is first adjusted from 3 pixels to 6 pixels, which are the number of pixels that would have been traversed if the surface were situated in parallel with the viewport. Thereafter the adjusted pixel-wise traversal distance is converted to the corresponding voxel-wise travel distance. The voxel-wise travel distance is a travel distance of the selected part in the 3D volume space as indicated by the user.

In block 44, based on the voxel-wise travel distance of the selected part, a user-specified time $t_{user}$ is determined, which is a user-specified part destination point on the animation timeline. Referring back to FIGS. 1A-1C, for example, if the user-specified voxel-wise travel distance of the piston 4 on the display is determined to be 15 voxels, while the total travel distance of the piston 4 between time t0 (=0 s in FIG. 1A) and t2 (=20 s in FIG. 1C) is 60 voxels, then the user-specified time $t_{user}$ along the animation timeline may be calculated as $t_{user}$= (20 s−0 s)×15/60=20 s×0.25=5 s in this example. The user-specified time $t_{user}$ is a point on the animation timeline at which a frame of the animation would show the selected part in its user-specified destination position.

After the user-specified time $t_{user}$ is determined in block 38 in FIG. 3, at block 46, it is determined whether the user-specified time $t_{user}$ is outside the animation timeline boundary. In other words, it is determined whether $t_{user}$ is the same as or prior to $t_{start}$ ($t_{user} \le t_{start}$) and whether $t_{user}$ is the same as or after $t_{end}$ ($t_{user} \ge t_{end}$).

If "NO," that is, if the user-specified time $t_{user}$ is within the animation timeline boundary, then at block 48, animation time $t_{animation}$ is updated to the determined user-specified time $t_{user}$. At block 50, a key frame corresponding to $t_{animation}$ is shown on the display. For example, if $t_{animation}$=5 s and a key frame of t=5 s exists, that key frame is shown. Similarly, if $t_{animation}$=5.5 s, the key frame of t=5 s may be shown if the difference of 0.5 s is determined to be small enough and the key frame of t=5 s is considered to be fairly representative of the selected part at its user-specified time $t_{user}$. As a further example, if $t_{animation}$=6 s and two adjacent key frames of t=5 s and t=7 s exit (but no key frame of t=6 s exists), then an interpolated frame may be generated using any suitable interpolation technique based on the two key frames. The interpolated frame is then shown on the display to represent the selected part at its user-specified designation position. The algorithm then returns from block 50 to block 32, and waits for the user's continuous selection of the same part or a new selection of a different part. For example, the algorithm continues to loop as long as the user keeps moving the selected part, forward and backward along the animation timeline, to effect 3D inverse kinematics on the display. As a specific example, the user may keep selecting and moving (e.g., dragging) the piston 4 up and down on the display, as shown in FIGS. 1A-1C, during which the algorithm of FIG. 3 continues to loop.

Regardless of whether the key frame corresponding to $t_{animation}$ or an interpolated frame corresponding to $t_{animation}$ is shown, the displayed frame represents the selected part at its user-specified destination position and in proper relationships with the rest of the parts forming the object at that time ($t_{animation}$). That is, other moving parts of the object also appear to have properly moved to their respective destination positions in correspondence to the user-specified movement of the selected part. Thus, the algorithm as shown in FIG. 3 allows the user to implement inverse kinematics by simply selecting and moving (e.g., dragging a cursor, a finger, a stylus pen, etc., on) any of the movable parts of a 3D graphics object on the display. In short, the user may use any of the movable parts as a scroll/slide button to move the animation forward and backward along (and within) the animation timeline. The inverse kinematics achieved by the algorithm does not require formulating and computing complex kinematic equations that define movement of various parts of an object in terms of joint parameters. Accordingly, the algorithm allows a user to quickly build an inverse kinematics 3D graphics animation, as well as to interact with the animation in real time to learn how the parts move in relation to each other.

Returning back to block 46 of FIG. 3, if it is determined that the user-specified time $t_{user}$ is on the animation timeline boundary (i.e., at $t_{start}$ or at $t_{end}$) or is outside of the animation timeline boundary (i.e., prior to $t_{start}$ or after $t_{end}$, for example, $t_{user}$ is calculated to be 35 s in block 38 when $t_{end}$=30 s), then the algorithm proceeds to block 52. Briefly, when the user-specified movement of the selected part would place the selected part on or outside of the animation timeline boundary, a special treatment may be needed to effect the user-specified movement of the selected part on the display.

At block 52, it is determined whether the selected part is a "detachable" part or a "non-detachable" part. To this end, each of the movable parts of an object shown in the animation may be pre-defined as either detachable or not-detachable from the object. For example, referring to FIG. 1C that shows the engine 1 at the animation end time $t_{end}$, it may be desirable to allow a user to detach the piston 4 from the rest of the engine 1 so that the user can view the piston 4 in isolation, enlarge the piston 4, or rotate the piston 4, to study further details of the piston 4. As discussed above, because the piston 4 is represented by a 3D volume graphics voxel set in this example, such manipulation of the piston 4 is possible outside the animation boundary. Then, the piston 4 may be pre-defined as a detachable part. On the other hand, some of the parts may be pre-defined as non-detachable parts. For example, those parts that are not supposed to be detached or disassembled for real may be designated as non-detachable so that the user cannot simulate detaching them in a 3D volume graphics model.

If the selected part is determined to be a detachable part, the algorithm proceeds to block 54, and a projected destination position of the selected part on the display is determined based on the user-specified time $t_{user}$. Essentially this is a reverse process of a process performed in block 38 above, where the user-specified time $t_{user}$ is determined based on the user-specified physical destination position of the selected part on the display. That is, in block 38 how much to move the part along the animation timeline ($t_{user}$) is determined based on the pixel-wise traversal distance of the part as indicated by the user, while in block 54, a pixel-wise distance of the part movement (or how much the detachable part should move) is determined based on $t_{user}$.

Then, proceeding to block 56, the selected (detachable) part is shown at the projected designation position on the display, as determined in block 54. At this time, the last key frame shown on the display remains displayed as a background, from which only the selected part is detached and moved freely. Thus, in most cases the last key frame shown on the display would be either a starting key frame of $t_{start}$ or an ending key frame of $t_{end}$. The algorithm then returns from block 56 to block 32, and waits for the user's continuous selection of the same part or a new selection of a different part. If the user continues to select the same part and the user-specified time ($t_{user}$) remains outside the animation timeline boundary ("YES" in block 46) then the user may continue to freely move the selected part as detached from the rest of the object as in block 56. On the other hand, if the user continues to select the same part but the user-specified time ($t_{user}$) returns within the animation timeline boundary ("NO" in block 46) then the algorithm proceeds to block 48 and block 50 to effect 3D inverse kinematics on the display.

At block 52, on the other hand, if the selected part is determined to be non-detachable, then proceeding to block 58, a time-wise closer one of a starting key frame of $t_{start}$ or an ending key frame of $t_{end}$ is displayed. That is, if $t_{user}$ is closer to $t_{start}$ than to $t_{end}$, a starting key frame is displayed, and vice versa. This means that, in this situation, the user simply cannot move the selected part outside the animation timeline boundary. The algorithm then returns from block 58 to block 32, and waits for the user's continuous selection of the same part or a new selection of a different part.

While the above example of an embodiment of the invention has been described using the piston 4 as a part selected to be moved to implement inverse kinematics, of course any one of the other movable parts of the object 1 may be selected to effect inverse kinematics. One novel feature of the present invention is that an animated part is used as a control element to move an animation along its timeline. In the example shown in FIGS. 1A-1C, a user selects and moves (e.g., drags) the piston 4 on the display to control the engine animation, similarly to how a user moves a conventional slide/scroll button to control any animation forward or rearward along its timeline. The use of an animated part as a control element in turn allows for achieving highly user-interactive and real-time inverse kinematics.

Figure 3A:
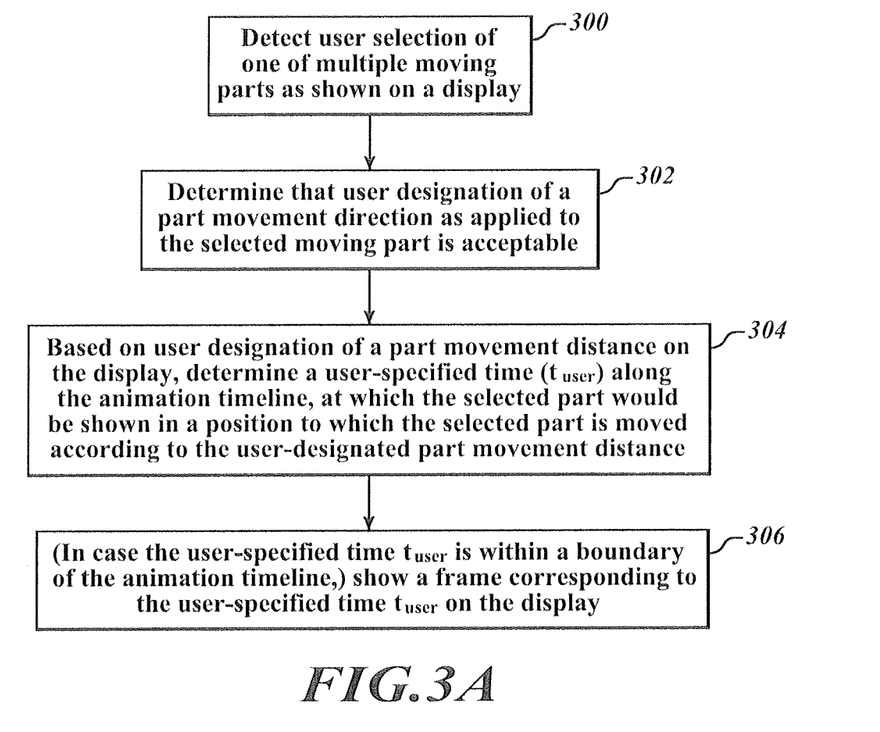
FIG. 3A is another flow chart illustrating an inverse kinematics algorithm in a general form applicable to any 3D graphics animation, not limited to a 3D volume graphics animation or a key-frame based animation, according to one embodiment of the present invention.
Figure 3B:
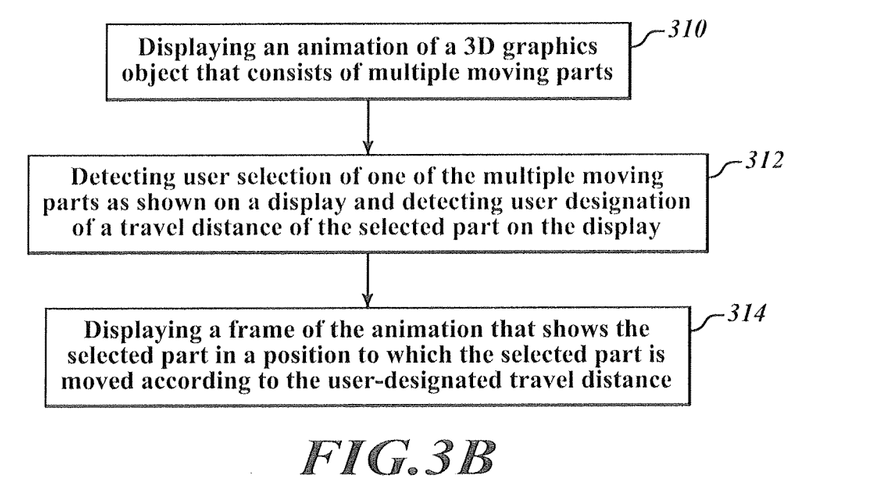
FIG. 3B is yet another flow chart illustrating a general form of an inverse kinematics algorithm, which allows a user to manipulate any of moving parts depicted in an animation as a scroll/slide button to control the animation along its timeline, according to one embodiment of the present invention.

FIG. 3A is another flow chart illustrating an inverse kinematics algorithm in a general form according to one embodiment of the present invention. While the embodiment described above in reference to FIG. 3 is based on an animation that consists of multiple key frames, an inverse kinematics algorithm according to various embodiments of the present invention may be equally applicable with other types of 3D animation that are not based on key frames, such as a parametric animation and a spline-based animation. FIG. 3A and FIG. 3B illustrate these inverse kinematics algorithms in a general form, applicable with any type of a 3D animation that depicts a 3D object consisting of multiple moving parts.

As in the embodiment of FIG. 3, before the algorithm is executed, the memory of a system for implementing inverse kinematics is loaded with an animation of a 3D graphics object that consists of multiple moving parts. The animation is associated with an animation timeline defined by two end points, a starting time point $t_{start}$ and an ending time point $t_{end}$, to depict interactive movement of the multiple parts of the object along the animation timeline.

In block 300, user selection of one of the multiple moving parts as shown on a display is detected. As before, this may be achieved by, for example, detecting user's clicking on, or placing a cursor, his/her finger, a stylus pen, etc. over, the selected part on the display. In block 302, it is determined whether user designation of a part movement direction as applied to the selected moving part is acceptable. As before, this may be achieved by comparing the user-designated part movement direction with a defined direction along which the selected part is supposed to move in the animation.

In block 304, based on user designation of a part movement distance on the display, a user-specified time ($t_{user}$) on the animation timeline is determined. As before, the user-specified time ($t_{user}$) is a point on the animation, at which the selected part would be shown in a position to which the selected part is moved according to the user-designated part movement distance. That is, the animation at the user-specified time ($t_{user}$) along its timeline would show the selected part at user, its destination position as specified by the user. Also as before, the user-designated part movement distance may be determined based on a pixel-wise traversal distance as designated by the user on the display.

In block 306, in case the user-specified time $t_{user}$ is within a boundary of the animation timeline for example, an animation frame corresponding to the user-specified time $t_{user}$ is shown on the display. For example, in case of a key-frame based animation, one of the plurality of key frames whose time is closest to the user-specified time $t_{user}$ may be selected and shown, or an interpolated frame generated based on interpolation of at least some of the plurality of key frames for the user-specified time $t_{user}$ may be shown. In case of an animation not based on key frames, such as a parametric animation and a spline-based animation, an animation frame corresponding to the user-specified time $t_{user}$ may be computed and shown.

Further alternatively, in one embodiment of block 306, a frame corresponding to the user-specified time $t_{user}$ is shown on the display regardless of whether $t_{user}$ is within a boundary of the animation timeline of not. For example, if $t_{user}$ is the same as or prior to $t_{start}$ ($t_{user} \leq t_{start}$), then the starting frame of $t_{start}$ may be selected or computed as a corresponding frame and shown. Similarly, if $t_{user}$ is the same as or after $t_{end}$ ($t_{user} \geq t_{end}$), then the ending frame of $t_{end}$ may be selected or computed as a corresponding frame and shown. The algorithm may loop through blocks 300, 302, 304, and 306 as long as the user continues to select and move any of the multiple moving parts within the animation timeline boundary.

On the other hand, in case the user-specified time $t_{user}$ is on or outside the animation timeline boundary, a projected destination position of the selected part on the display at the user-specified time $t_{user}$ may be determined (see FIG. 3, block 54) in case the selected part is defined as detachable, and the selected part is shown at the projected destination position (FIG. 3, block 56). I in case the selected part is defined as not-detachable, the starting key frame or the end key frame may be shown on the display (FIG. 3, block 58).

FIG. 3B is another flow chart illustrating an inverse kinematics algorithm in a general form, which allows a user to manipulate any of moving parts of an object depicted in an animation as a scroll/slide button to move the animation along its animation timeline, according to one embodiment of the present invention. Block 310 includes displaying on a display an animation of a 3D graphics object that consists of multiple moving parts. The animation is associated with an animation timeline defined by two end points, a starting time point $t_{start}$ and an ending time point $t_{end}$, to show interactive movements of the multiple parts of the object along the animation timeline. Block 312 includes detecting user selection of one of the multiple moving parts as shown on the display and detecting user designation of a travel distance of the selected part on the display. Block 314 includes displaying a frame of the animation that shows the selected part at a position to which the selected part is moved according to the user-designated travel distance.

Figure 5:
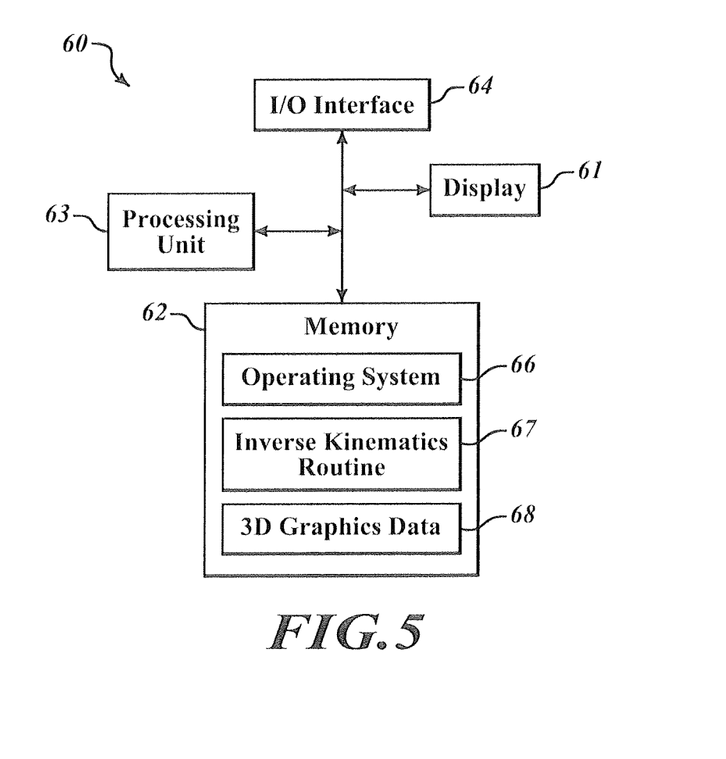
FIG. 5 is a block diagram of several components of a computing device suitable for executing an inverse kinematics algorithm according to an embodiment of the present invention.

FIG. 5 is a block diagram illustrating several of the key components of a computing device 60, which may be used to execute an inverse kinematics algorithm according to various embodiments of the present invention. Those skilled in the art will appreciate that the computing device 60 may include many more components than those shown in FIG. 5. However, it is not necessary that all of these generally conventional components be shown in order to disclose an enabling embodiment for practicing the invention. As shown in FIG. 5, the computing device 60 includes a display 61, a memory 62, a processing unit 63, and an input/output ("I/O") interface 64, all interconnected via a bus. The display 61 may be a touch sensitive display in some embodiments. The I/O interface 64 is provided for connection to other devices, such as an external storage or a network (not shown), from which a 3D graphics animation (key-frame based, parametric based, spline-based, etc.) depicting movement of multiple parts of an object (voxel-based, polygon-based, etc.) may be loaded onto the computing device 60 (or the memory 62). The I/O interface 64 includes the necessary circuitry for such a connection and is constructed for use with the necessary protocols, as will be appreciated by those skilled in the art.

The memory 62 generally comprises a random access memory ("RAM"), a read-only memory ("ROM"), and a permanent mass storage device, such as a hard disc drive, tape drive, floppy disc drive, optical disc drive, magneto-optical disc drive, flash memory drive (e.g., USB flash drive), drum memory, or combination thereof. The memory 62 stores an operating system 66 and an inverse kinematics algorithm/routine 67 such as the one shown in FIGS. 3, 3A and 3B, and a database 68 for storing 3D graphics data based on which an animation depicting movement of multiple parts of an object can be built.

Although an exemplary computing device 60 has been described that generally conforms to a conventional computing device, those skilled in the art will appreciate that a computing device 60 may be any of a great number of devices capable of executing an inverse kinematics algorithm according to the present invention. In various exemplary embodiments of the present invention, the computing device 60 does not require specialized hardware. Rather, a standard processor is sufficient, as used in a typical desktop or laptop computer or in a mobile device such as a tablet device. Further, a constrained memory, i.e., a limited amount of memory relative to a typical computer graphics rendering system, may be sufficient.

The various embodiments described above can be combined to provide further embodiments. All of the U.S. patents, international patent applications and non-patent publications referred to in this specification are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented system comprising a processor, a memory, and a 2D display, wherein:

the memory is configured to be loaded with a pre-existing animation of a 3D graphics object having multiple distinct parts that are discretely selectable, the animation including multiple frames that respectively depict the 3D graphics object wherein the multiple distinct parts move frame by frame but are in defined shapes per frame, wherein the animation has an animation timeline of a fixed time length defined by a starting time point and an ending time point to depict interactive movements of the multiple distinct parts of the object along the animation timeline; and the processor, when loaded with computer-executable instructions, executes an algorithm including:

(i) detecting user selection of one of the multiple distinct parts in one of the multiple frames of the animation as shown on the display, the frame being associated with a corresponding frame time ($t_{frame}$) along the animation timeline;

(ii) determining that user designation of a part movement direction as applied to the selected distinct part in the frame of the animation as shown on the display is acceptable;

(iii) selecting a frame, out of the multiple frames of the animation, which depicts the selected distinct part at its new user-moved position, based on user designation of a part movement distance ending at the new user-moved position on the 2D display, by (iii-a) determining a user-specified time ($t_{user}$) along the animation timeline, at which time in the animation the selected distinct part is shown at the new user-moved position, and (iii-b) selecting the frame that is associated with the determined, user-specified time $t_{user}$; and (iv) showing the selected frame of the animation on the display.

2. The system according to claim 1, wherein the algorithm further includes:

(v) in case the user-specified time $t_{user}$ is on or outside a boundary of the animation timeline, (a) determining a projected destination position of the selected distinct part on the display at the user-specified time $t_{user}$, (b) in case the selected distinct part is defined as detachable, showing the selected distinct part at the projected destination position, and (c) in case the selected distinct part is defined as not-detachable, showing on the display a frame corresponding to the starting time point or the ending time point that is closer to the user-specified time $t_{user}$.

3. The system according to claim 1, wherein the animation consists of a plurality of key frames including a starting key frame and an ending key frame, and (iv) includes showing one of the plurality of key frames whose associated time is closest to the user-specified time $t_{user}$.

4. The system according to claim 1, wherein the animation consists of a plurality of key frames including a starting key frame and an ending key frame, and (i-iii) includes selecting an interpolated frame, which is generated based on interpolation of at least some of the plurality of key frames for the user-specified time $t_{user}$.

5. The system according to claim 1, wherein (iii-a) includes:
- a) determining a pixel-wise distance that corresponds to the user-designated part movement distance on the display;
- b) converting the pixel-wise distance to a 3D-wise distance in the 3D graphics object space; and
- c) based on the 3D-wise distance of the selected distinct part, determining the user-specified time $t_{user}$ on the animation timeline.

6. The system according to claim 1, wherein the algorithm repeats (i)-(iv) as long as a user selects and moves one of the multiple distinct parts within a boundary of the animation timeline.

7. A computer-implemented method comprising:
- loading to a memory device a pre-existing animation of a 3D graphics object having multiple distinct parts that are discretely selectable, the animation including multiple frames that respectively depict the 3D graphics object wherein the multiple distinct parts move frame by frame but are in defined shapes per frame, wherein the animation has an animation timeline of a fixed time length defined by a starting time point and an ending time point to depict interactive movements of the multiple distinct parts of the object along the animation timeline;
- (ii) detecting user selection of one of the multiple distinct parts in one of the multiple frames of the animation as shown on a 2D display, the frame being associated with a corresponding frame time ($t_{frame}$) along the animation timeline;
- (iii) determining that user designation of a part movement direction as applied to the selected distinct part in the frame of the animation as shown on the display is acceptable;
- (iv) selecting a frame, out of the multiple frames of the animation, which depicts the selected distinct part at its new user-moved position, based on user designation of a part movement distance ending at the new user-moved position on the 2D display, by (iv-a) determining a user-specified time ($t_{user}$) on the animation timeline, at which time in the animation the selected distinct part is shown at the new user-moved position, and (iv-b) selecting the frame that is associated with the determined user-specified time $t_{user}$; and
- (v) showing the selected frame of the animation on the display.

8. The method according to claim 7, wherein (ii) includes visually differentiating one of the multiple distinct parts as selected by a user on the display.

9. The method according to claim 7, wherein (iii) includes comparing the user-designated part movement direction with a defined direction along which the selected distinct part is supposed to move in the animation.

10. The method according to claim 9, wherein the user-designated part movement direction is determined to be acceptable if it corresponds to the defined direction within a defined tolerance range.

11. The method according to claim 7, wherein (iv-a) includes:
- a) determining a pixel-wise distance that corresponds to the user-designated part movement distance on the display;
- b) converting the pixel-wise distance to a 3D-wise distance in the 3D graphics space; and
- c) based on the 3D-wise distance of the selected distinct part, determining the user-specified time $t_{user}$ along the animation timeline.

12. The method according to claim 7, wherein the animation consists of a plurality of key frames including a starting key frame and an ending key frame, and (v) includes showing one of the plurality of key frames whose associated time is closest to the user-specified time $t_{user}$.

13. The method according to claim 7, wherein the animation consists of a plurality of key frames including a starting key frame and an ending key frame, and (iv) includes selecting an interpolated frame, which is generated based on interpolation of at least some of the plurality of key frames for the user-specified time $t_{user}$.

14. The method according to claim 7, further comprising repeating (ii)-(v) as long as a user selects and moves one of the multiple distinct parts within a boundary of the animation timeline.

15. The method according to claim 7, further comprising:
- (vi) in case the user-specified time $t_{user}$ is on or outside a boundary of the animation timeline, (a) determining a projected destination position of the selected distinct part on the display at the user-specified time $t_{user}$, (b) in case the selected distinct part is defined as detachable, showing the selected distinct part at the projected destination position, and (c) in case the selected distinct part is defined as not-detachable, showing on the display a frame corresponding to the starting time point or the ending time point that is closer to the user-specified time $t_{user}$.

16. The method according to claim 15, wherein each of the multiple distinct parts is pre-defined as detachable or not-detachable.

17. The method according to claim 15, wherein (vi)(b) includes showing the selected distinct part at the projected destination position on a last frame that has been shown on the display.

18. A non-transitory computer-readable storage medium whose contents configure a computing system to perform a method, the method comprising:
- displaying, on a 2D display of the computing system, a pre-existing animation of a 3D graphics object having multiple distinct parts that are discretely selectable, the animation including multiple frames that respectively depict the 3D graphics object wherein the multiple distinct parts move frame by frame but are in defined shapes per frame, wherein the animation has an animation timeline of a fixed time length defined by a starting time point and an ending time point to depict interactive movements of the multiple distinct parts of the object along the animation timeline;
- (ii) detecting user selection of one of the multiple distinct parts in one of the multiple frames of the animation as shown on the display, the frame being associated with a corresponding frame time ($t_{frame}$) along the animation timeline, and detecting user designation of part movement distance of the selected distinct part ending at a new user-moved position in the frame of the animation as shown on the 2D display;

(iii) selecting a frame, out of the multiple frames of the animation, which depicts the selected distinct part at its new user-moved position, by (iii-a) determining a user-specified time ($t_{user}$) on the animation timeline, at which time in the animation the selected distinct part is shown at the new user-moved position, and (iii-b) selecting the frame that is associated with the determined user-specified time $t_{user}$; and (iv) displaying the selected frame of the animation.

19. The medium according to claim 18, wherein the animation consists of a plurality of key frames including a starting key frame and an ending key frame, and (iv) includes displaying one of the plurality of key frames whose associated time is closest to the user-specified time $t_{user}$ or displaying an interpolated frame, which is generated based on interpolation of at least some of the plurality of key frames for the user-specified time $t_{user}$.

\* \* \* \* \*

UNITED STATES PATENT AND TRADEMARK OFFICE
CERTIFICATE OF CORRECTION

| | |
|---|---|
| PATENT NO. | : 9,342,913 B2 |
| APPLICATION NO. | : 13/770900 |
| DATED | : May 17, 2016 |
| INVENTOR(S) | : Chun Yue Gordon Wong et al. |

It is certified that error appears in the above-identified patent and that said Letters Patent is hereby corrected as shown below:

Column 13, Line 27:
"loading to a memory device a pre-existing animation of a" should read, --(i) loading to a memory device a pre-existing animation of a--.

Column 14, Line 52:
"displaying, on a 2D display of the computing system, a" should read, --(i) displaying, on a 2D display of the computing system, a--.

Signed and Sealed this
Second Day of August, 2016

Michelle K. Lee
*Director of the United States Patent and Trademark Office*